March 30, 1943.　　R. J. WISE ET AL　　2,315,361
SYSTEM AND APPARATUS FOR FACSIMILE TELEGRAPHY
Filed Sept. 2, 1939　　9 Sheets-Sheet 1
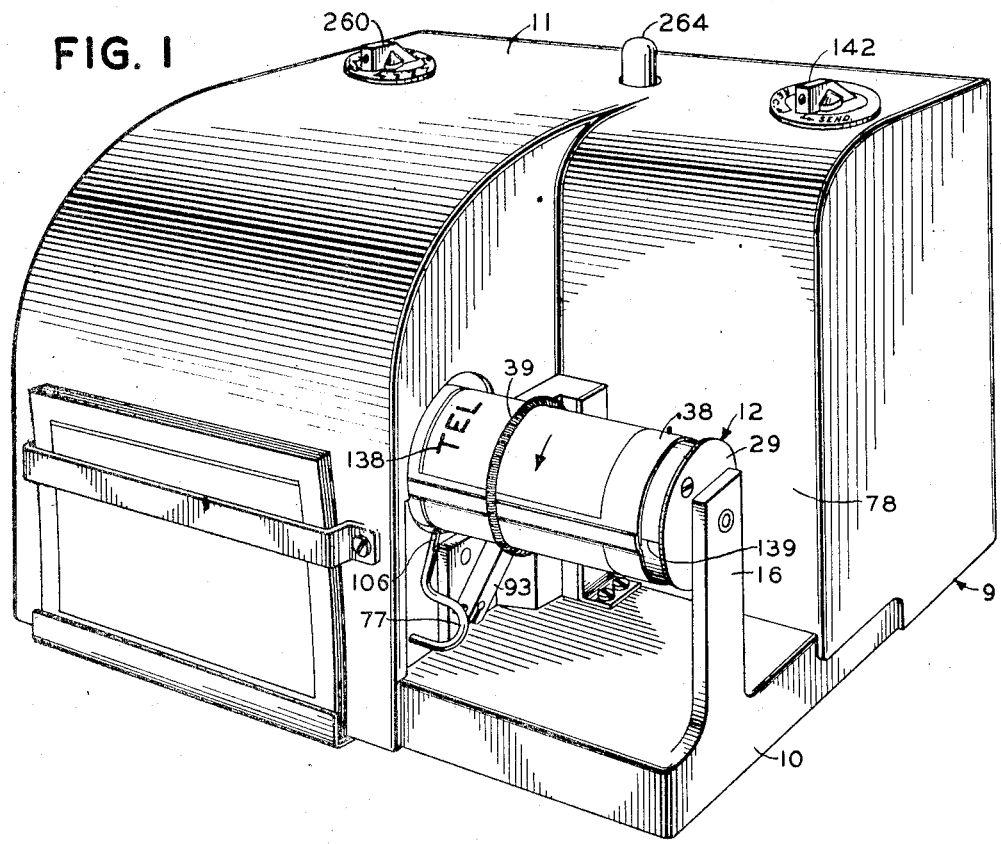
FIG. I
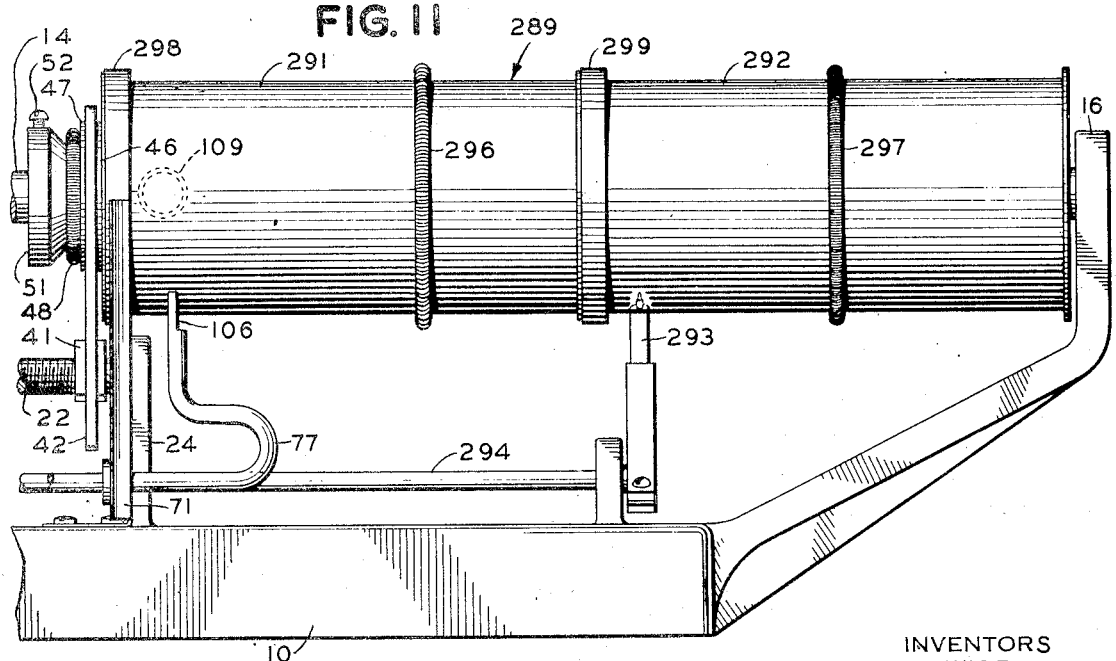
FIG. II
INVENTORS
R. J. WISE
L. G. STEWART
R. D. PARROTT
BY George J. Craig
ATTORNEY INVENTORS
R. J. WISE
L. G. STEWART
R. D. PARROTT
BY George F. Craig
ATTORNEY March 30, 1943. R. J. WISE ET AL 2,315,361
SYSTEM AND APPARATUS FOR FACSIMILE TELEGRAPHY
Filed Sept. 2, 1939 9 Sheets-Sheet 3

INVENTORS
R. J. WISE
L. G. STEWART
R. D. PARROTT
BY George P. Craig
ATTORNEY

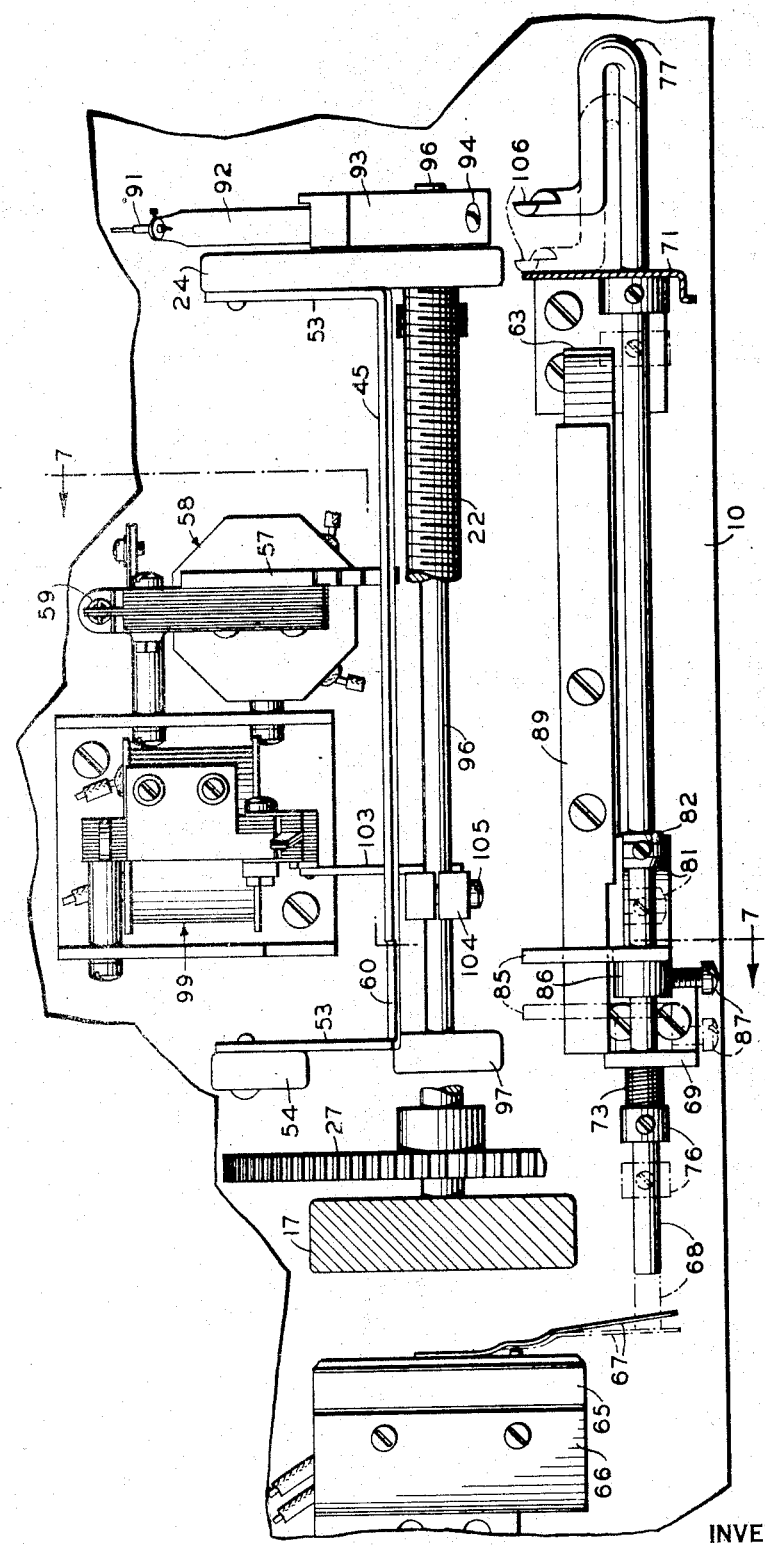

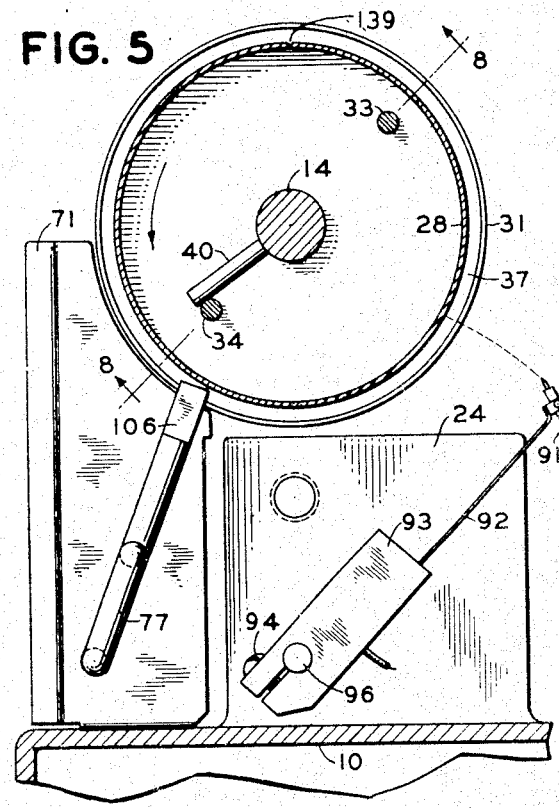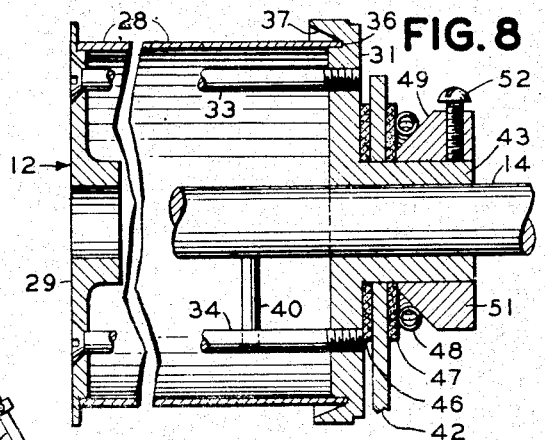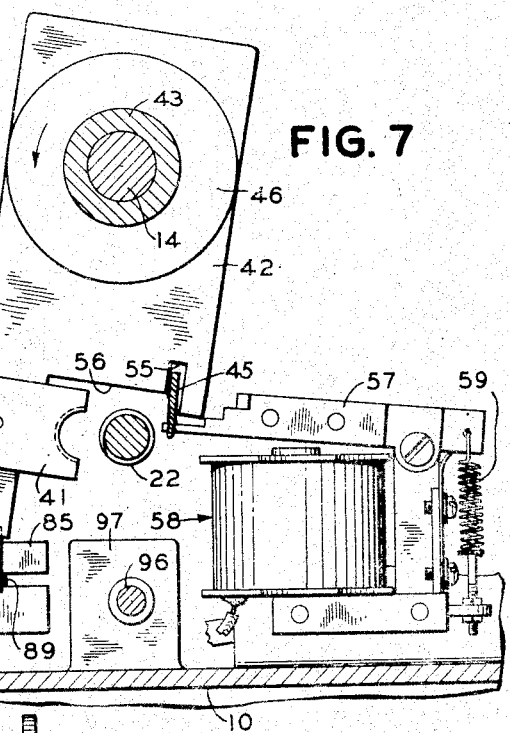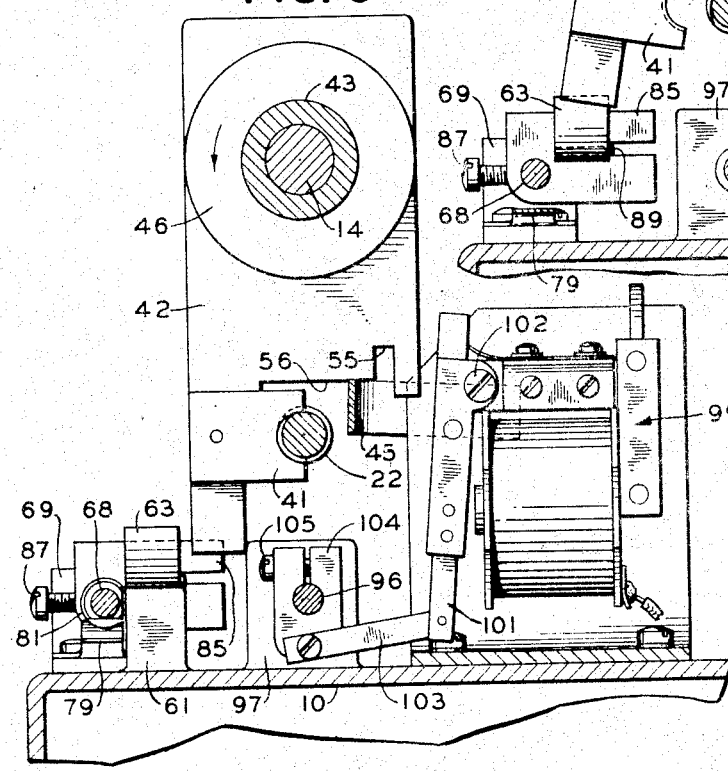

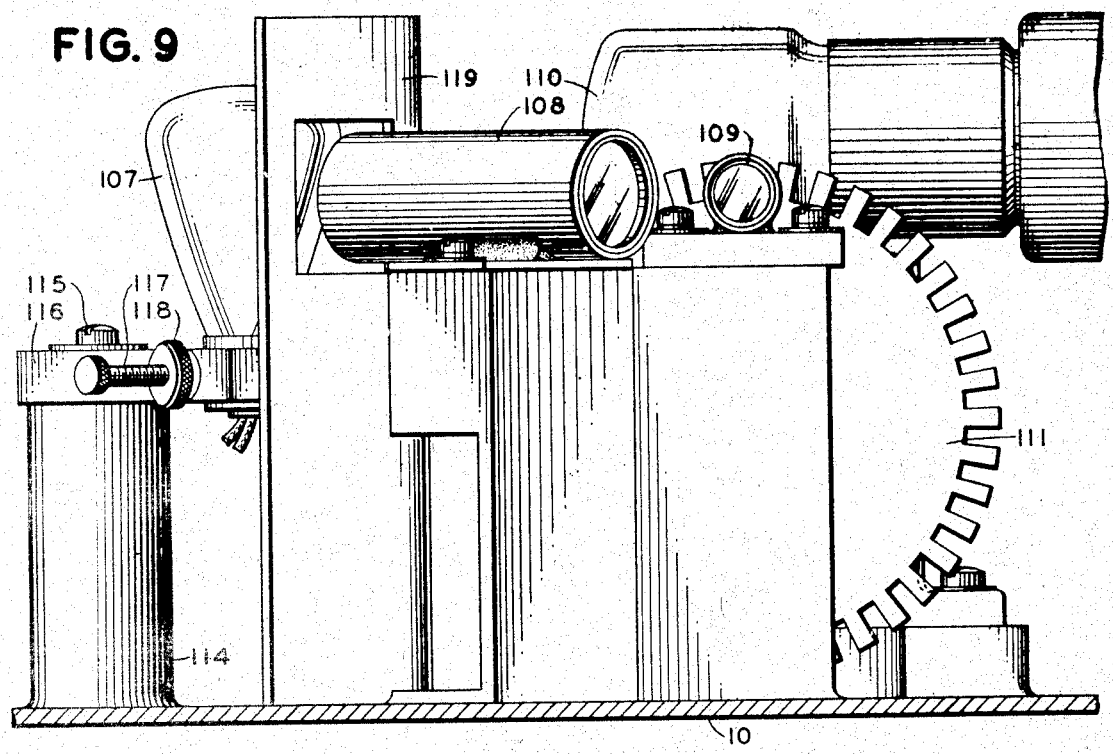
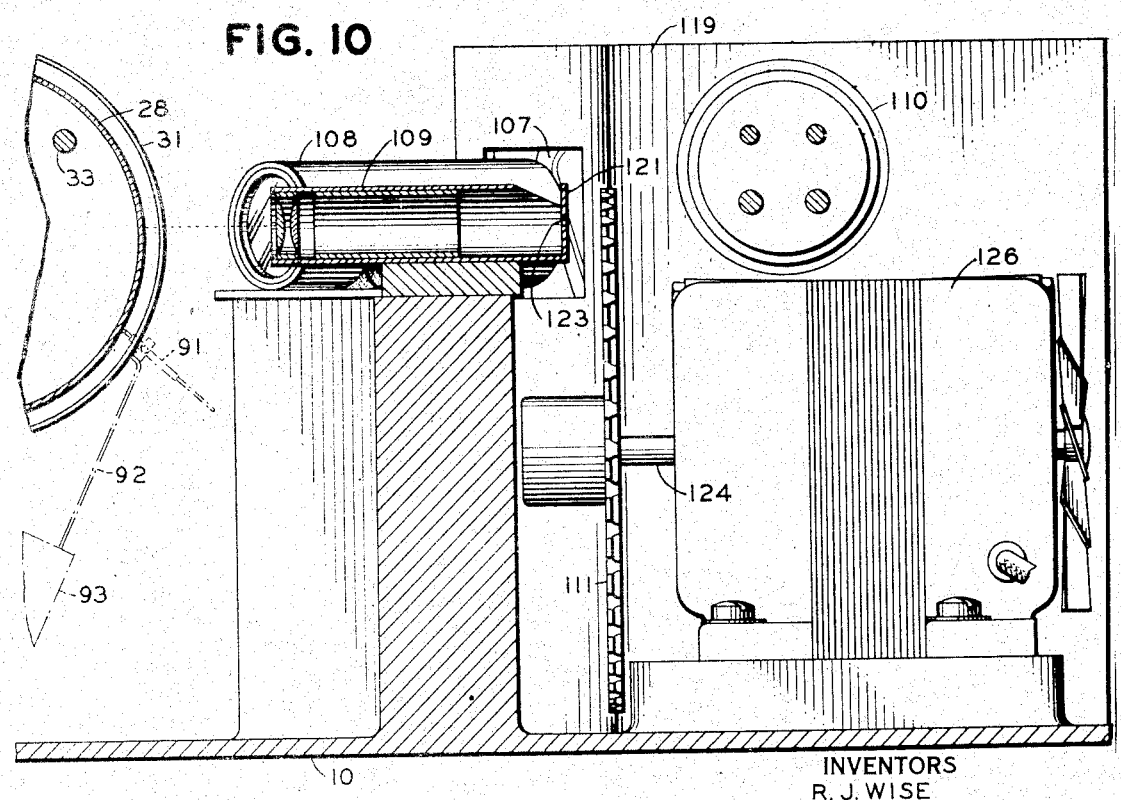

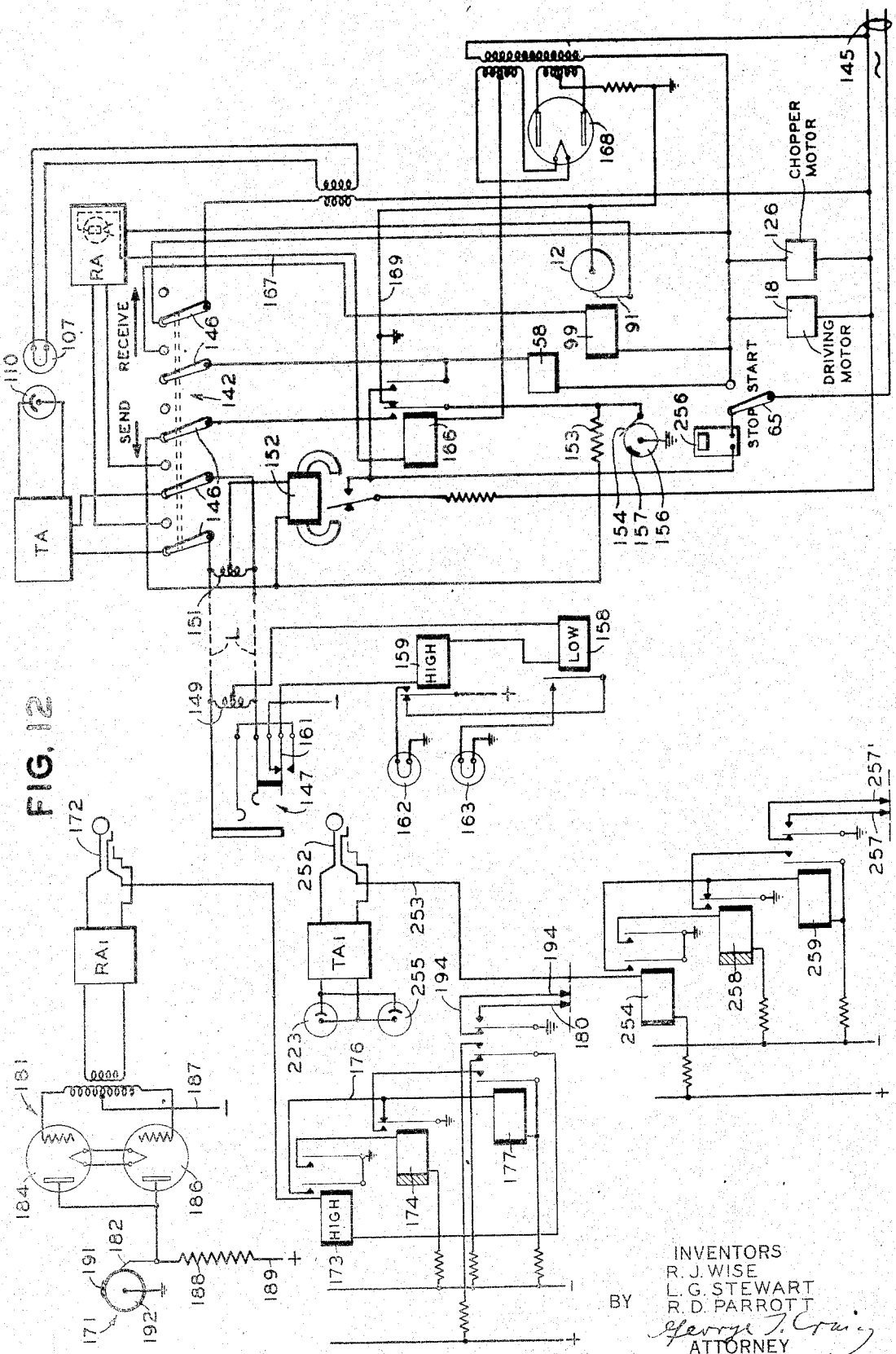

March 30, 1943.  R. J. WISE ET AL  2,315,361

SYSTEM AND APPARATUS FOR FACSIMILE TELEGRAPHY

Filed Sept. 2, 1939   9 Sheets-Sheet 8

INVENTORS
R. J. WISE
L. G. STEWART
BY  R. D. PARROTT
George T. Craig
ATTORNEY

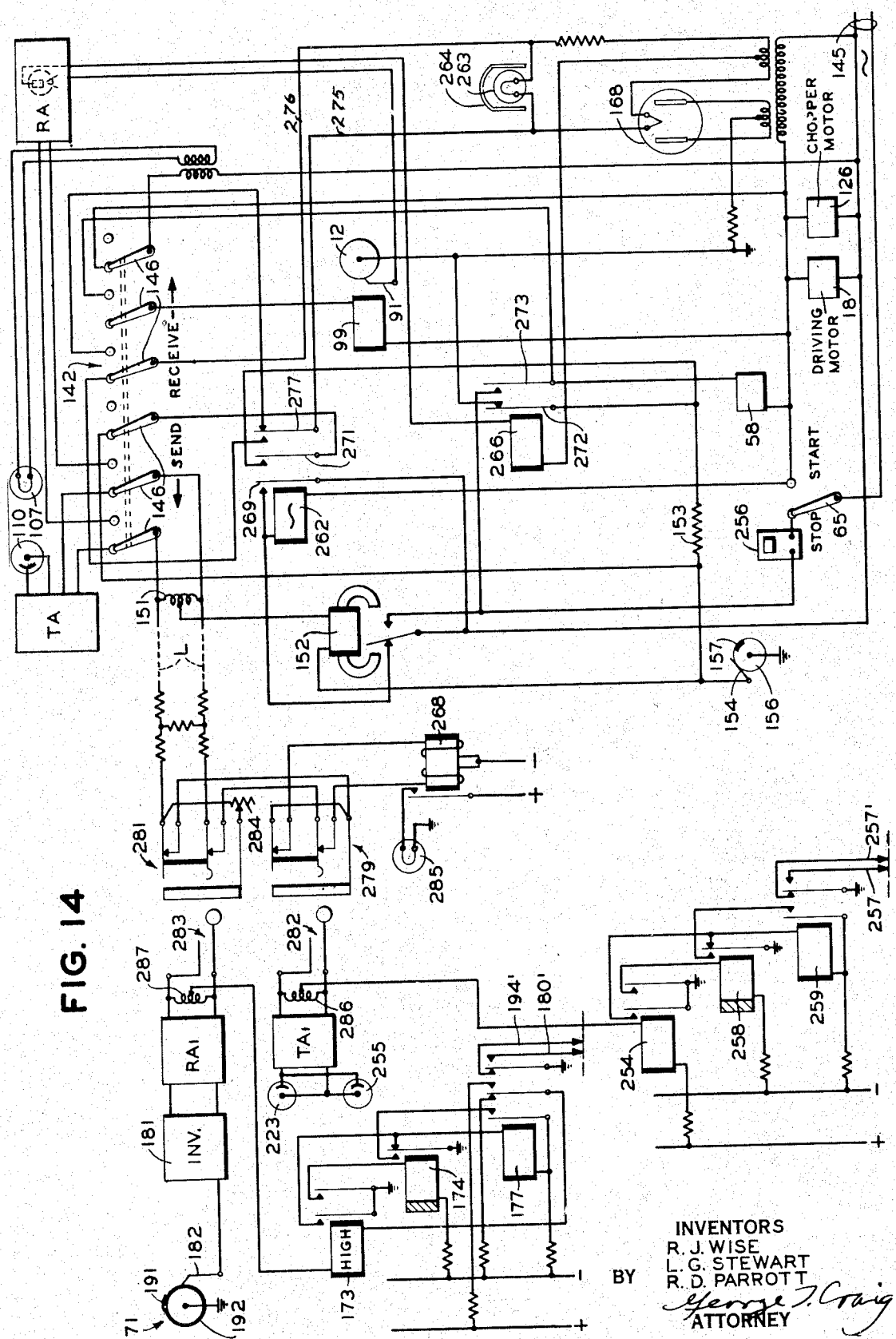

Patented Mar. 30, 1943

2,315,361

UNITED STATES PATENT OFFICE 2,315,361

SYSTEM AND APPARATUS FOR FACSIMILE TELEGRAPHY

Raleigh J. Wise, Dunellen, Louis G. Stewart, Rutherford, and Robert D. Parrott, West New York, N. J., assignors to The Western Union Telegraph Company, New York, N. Y., a corporation of New York Application September 2, 1939, Serial No. 293,188

30 Claims. (Cl. 178—6.6)

The present invention relates to telegraphy, and more particularly to novel systems and apparatus for communication by the transmission of pictures, messages and other subject matter in facsimile.

The primary object of the present invention is to provide a novel combined facsimile transmitter and receiver which may be operated by an inexperienced person and which therefore makes it available for personal use by a patron of a commercial telegraph service or other members of the general public.

Another object of the invention is to provide a novel system for facsimile intercommunication with a central office of a telegraph company.

In accordance with the present invention, pictures, messages or other subject matter are transmitted from and received by a compact combined sender and receiver which operates appropriate signals at the central office with which communication is desired, but which, in the preferred system, is under the direct control of the operator. The simplicity of the apparatus and refinements of design embodied therein permit it to be operated by an inexperienced person without direct control being exercised from the central office during the transmission period. Likewise when the machine is used as a receiver, it is under control of an inexperienced operator, but is stopped automatically following the reception of a message.

A further object of this invention, therefore, is to provide novel facsimile apparatus having means for signalling a central office when facsimile communication therewith is desired.

A still further object of the invention is to provide a novel facsimile communication system affording means to signal a subscriber from a central office when communication is desired.

A still further object of the present invention is to provide facsimile telegraph apparatus embodying novel control means.

Still another object of the present invention resides in the provision of novel means for driving and advancing a copy-holder for cooperation with a pickup or recording device.

Still another object of the invention is to provide a novel facsimile telegraph system having several stations which may transmit messages in facsimile to a telegraph central office or receive messages therefrom.

The foregoing and other objects of the invention will appear from the following detailed description of an illustrative embodiment of the invention and several modifications thereof.

In the drawings:

Fig. 1 is a view in perspective of a combined facsimile transmitter and receiver embodying the invention in its preferred form;

Fig. 4 is an enlarged fragmentary horizontal sectional view taken on line 4—4 of Fig. 2;

Fig. 5 is an enlarged fragmentary vertical sectional view taken on line 5—5 of Fig. 3;

Fig. 6 is an enlarged fragmentary vertical sectional view taken on line 6—6 of Fig. 3;

Fig. 7 is a view similar to Fig. 6, a section being taken from the left side of Fig. 4 as indicated by the arrows on line 7—7 of Fig. 4;

Fig. 8 is an enlarged fragmentary sectional view of the copyholder taken on line 8—8 of Fig. 5;

Figs. 9 and 10 are sectional views illustrating details of the optical scanning device;

Fig. 11 is a view in front elevation of a modification of the machine illustrated in Fig. 1;

Fig. 12 is a diagrammatic showing of the electrical features of a control system in accordance with the invention;

Fig. 14 is similar to Fig. 12 and illustrates electrical features of a modified system.

Figure 2:
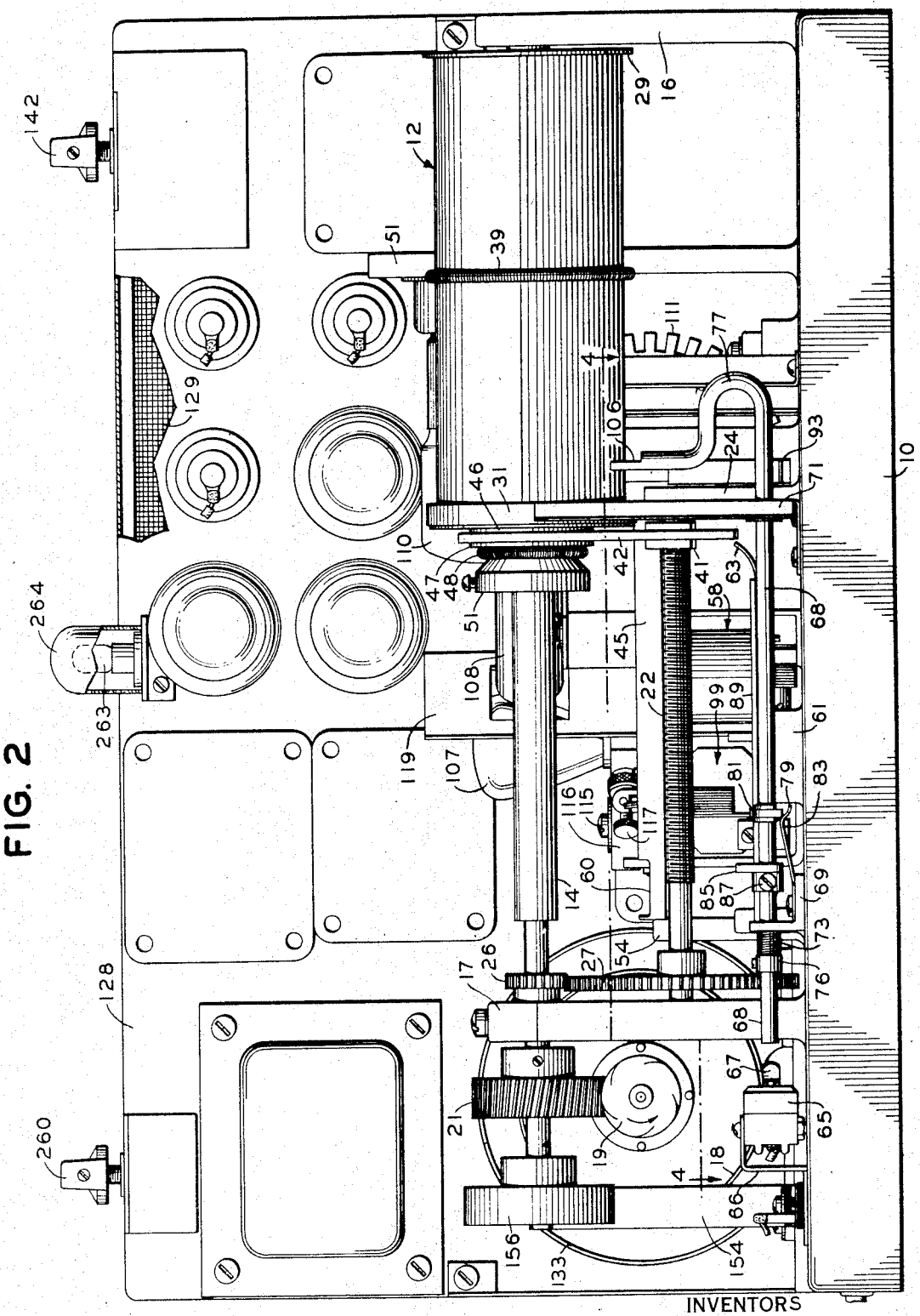
Fig. 2 is a front elevational view of the machine of Fig. 1 with the cover removed.

Referring to the drawings and for the present to Figs. 1 to 10 thereof, a combined transmitting and recording machine, indicated generally by the reference numeral 9, comprises a base or frame 10, a removable cover 11 and a copyholder 12. As shown more clearly in Fig. 2 of the drawings the copyholder 12, in the form of a cylinder or drum, is journaled for rotation upon a shaft 14, the latter being rotatably mounted in brackets 16 and 17 upstanding from the base 10. A motor 18, which is adapted for synchronized operation with a remote transmitter or receiver, imparts driving power to the shaft 14 by way of the worm 19 and the worm wheel 21 secured to the shaft. A lead screw 22 for advancing the cylinder 12 is journaled in brackets 17 and 24 and it is driven by a pinion 26 on the shaft 14, meshing with a gear 27 secured to the lead screw shaft.

Details of the structure of the copyholder 12 are illustrated by Fig. 8 which is seen to comprise a cylindrical shell 28 supported by the plate members 29 and 31, the latter members being slidably journaled on the shaft 14, and secured together by tie rods 33 and 34. The end member 31 is recessed as indicated at 36 to provide a projecting portion 37 which assists in retaining the sheet 38 (Fig. 1), which may be a message for transmission or a recording blank, in position on the copyholder. A spring garter 39 also assists in keeping the sheet 38 in position on the cylinder. The cylinder 12 is constrained to rotate with the shaft 14 by means of a pin 40 which engages the rod member 34 as shown in Figs. 5 and 8 while permitting the copyholder 12 to be freely rotated on the shaft 14 through an angle of approximately 180°.

Longitudinal scanning movement is imparted to the cylinder 12 from the lead screw 22 by means of a half nut member 41 which is carried adjacent the end of a member 42, the latter being journaled upon a boss 43 projecting from the end plate member 31 of the copyholder 12. During rotation of the copyholder 12, the half nut 41 is pressed into meshing engagement with the lead screw 22, unless it is restrained by the bail 45 and its associated mechanism later to be described, by means of friction discs 46 and 47 (Fig. 8). These discs are pressed against the sides of the member 42 and the disc 46 is pressed into engagement with the end wall of the cover member 31 by means of a garter spring 48 encircling the conical end 49 of a collar 51 which is secured to the boss 43 by a set screw 52. With the arrangement described, as the cylinder 12 rotates in the direction of the arrow as indicated in Fig. 6 the half nut member 41 will be retained in meshing engagement with the lead screw 22 so as to advance the cylinder toward the left as viewed in Fig. 2 of the drawings.

Referring now to Figs. 6 and 7 the bail member 45, previously referred to, has its inturned arms 53 pivotally mounted upon the upstanding bracket 24 and a bracket 54 (Fig. 4). The member 42 is notched as indicated at 55 to receive the bail member 45 which is pressed upwardly during normal operation of the machine against the horizontally extending portion 56 of the member 42 by means of the armature 57 of an electromagnet structure 58, which includes a biasing spring 59 tending to move its armature upwardly. When the cylinder 12 is rotated manually in a clockwise direction as viewed in Figs. 5 and 6 of the drawings, after the motor 18 has stopped, the member 42 travels therewith, due to friction members 46 and 47, until the upwardly biased bail member 45 enters the notch 55. This prevents the reengagement of the half nut 41 with the lead screw until the magnet 58 is energized. This position of the parts is shown in Fig. 7 of the drawings. Fig. 6 shows the position of the parts during scanning. Control of the motor 18 and operation of the magnet 58 will be described hereinafter in connection with the description of Figs. 12, 13 and 14 of the drawings. The bail member 45 is cut away or notched at 60 adjacent the unthreaded part of the lead screw shaft 22 so as to insure complete disengagement of the halfnut before the cylinder is returned to the right. If movement of the cylinder 12 is attempted without rotating it to disengage the halfnut 41 from the lead screw 22, the edge of the notch or depression 60, nearer the right hand side of the machine as viewed on Fig. 2, is abutted by the portion of the member 42 adjacent its edge 56. Upon rotation of the cylinder to disengage the halfnut from the lead screw, the parts 42 and 45 assume the position illustrated by Fig. 7 of the drawings and the cylinder may be returned to its starting position at the right.

Longitudinal movement of the cylinder 12 from its starting position at the right of Fig. 1 is prevented by a spring 62 (Figs. 2, 6 and 7) having an upturned end 63, which because of its flexibility permits the cylinder 12 to be moved to the right with the half nut disengaged, but prevents its movement to the left. The upturned end of the spring member 63 can be cleared by the end of the member 42 in preparation for movement to the left only when the magnet 58 is energized to withdraw the bail member 45 from the notch 55. The spring 63 is conveniently mounted on bracket 61.

A double throw switch 65 (Figs. 2 to 4) which is of the type biased to a normal position, is supported upon a bracket 66 so that its operating member 67 is aligned for engagement with the end of a switch operating rod 68 which is slidably mounted in a bracket 69 and a bracket member 71 (Fig. 4). The switch operating rod 68 is biased for movement toward the left by means of a spring 73 encircling the rod and bearing against bracket 69 and adjustable collar 76. A handle 77, formed at the end of the rod opposite the switch 65, is conveniently accessible to an operator, the casing 11 being recessed as shown at 78 (Fig. 1) to permit access to the cylinder 12 in its initial position and the handle. A spring 79 (Fig. 2), extending from the bracket 69, is provided to retain the rod 68 out of engagement with the switch operator 67 and is formed for engagement with a collar 81 adjustably secured to the rod by a set screw 82 (Fig. 4). The spring 79 is bent downwardly at its free end so that when the collar 81 has been drawn toward the right as viewed in Fig. 2 past the hump 83 on the spring the strength of the spring 73 is insufficient to return the rod to the left. The rod 68 is moved to the left into engagement with the switch operator 67 when the half-nut carrying member 42 is adjacent the end of its travel by engagement thereof with the top portion 85 of a stop member 86 adjustably secured to the rod 68 by a set screw 87. This stops operation of the machine at the end of a complete scanning movement of the drum 12. Unnecessary and unwanted rotation of the rod 68 is prevented by engagement of a notch in the member 86 with a flat member 88 secured to the support 61 which also holds the spring 63.

Pictures, messages, or other subject matter may be recorded on the sheet 38, which in this instance will be a suitable record blank, by a stylus 91 mounted at the end of a stylus carrying arm 92 (Fig. 5) which is in turn carried by a member 93. The latter is secured for angular adjustment by a set screw 94 upon a rock shaft 96. The rock shaft just mentioned is journaled in the previously described bracket 24 and a bracket 97 as shown in Fig. 4 of the drawings. When a record is to be made on the sheet 38, a stylus operating magnet indicated by the reference character 99 is energized as will be explained in connection with the description of Figs. 12 and 14 of the drawings. The armature 101 of this magnet is pivoted at 102 and is connected by a link 103 to a member 104 adjustably secured on the shaft 96 by means of a set screw 105. When the magnet 99 is energized the shaft 96 is rocked to bring the stylus 91 into contact with the record sheet. The handle 77 has an upturned end 106 which rolls the spring garter 39 along the cylinder as it advances to keep the spring garter clear of the scanning devices.

When the machine is to be used as a transmitter, the sheet 38 will display the picture or message to be transmitted which will be scanned by the photoelectric pick-up device (Fig. 3) comprising the lamp 107, the lens tubes 108 and 109, the photocell 110 and the light chopper 111. The lamp 107 is adjustably mounted upon a post 114 (see also Fig. 9) carried by the base 10, adjustment being accomplished by a set screw 115 which allows for rotation of the bracket 116 about the post 114 and a set screw and lock nut combination 117 and 118 which permits the lamp to be rotated around its own axis. An apertured shield 119 allows light flux from the lamp to pass through the tube 108 where it is focused upon the surface of the sheet 38. The lens tube 109 ends in an apertured wall 121 (Fig. 10) upon which is projected an image of the illuminated area of the sheet 38. Light from a small portion of this image passes through the aperture 123 and through the spaced slots in the light chopper 111 to the photocell 110. The light chopper disc 111 is supported on the rotor shaft 124 of the light chopper motor 126 and serves in a well known manner to cause the photocell 110 to generate a carrier frequency. It will be understood however that the carrier frequency may be generated separately and be modulated by the varying current produced in the photocell 110 as the subject matter on the sheet 38 is scanned.

Figure 3:
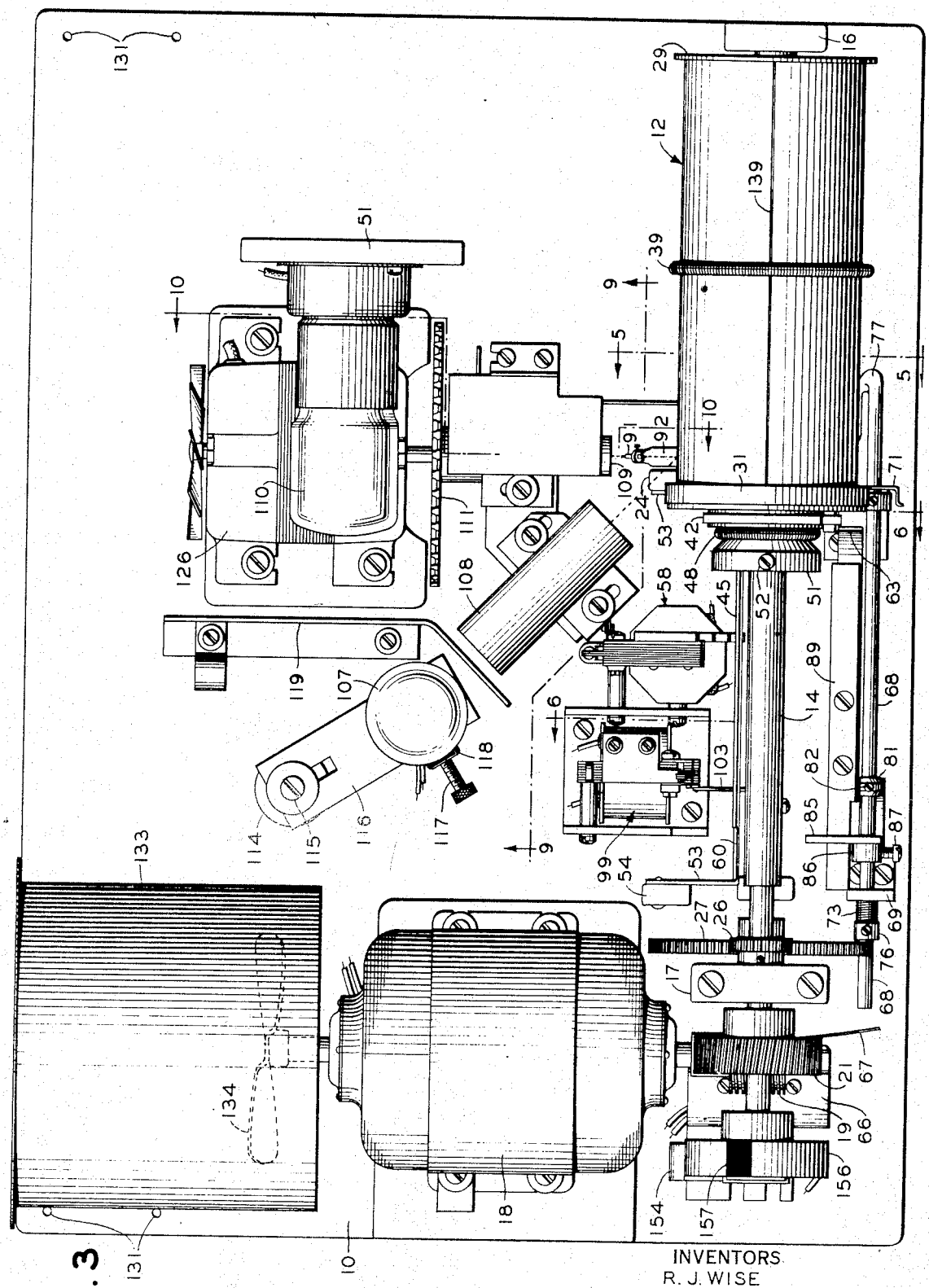
Fig. 3 is a view in plan with certain of the parts removed for the sake of clearness of illustration.

An upstanding instrument panel 128 of channel shape (Fig. 2), the open side of which extends to the rear and has mounted therein a filter or an air purifying member 129 of an appropriate type, is mounted adjacent the rear edge of the base 10 by screw threaded means engaged in holes 131 appearing in Fig. 3. Fumes or gases, which may be evolved during recording in the neighborhood of the stylus 91, are forced through a conduit member 133 by means of a fan 134 on the rotor shaft of the motor 18 to the chamber formed in the rear of the channel shaped instrument panel 128 and the deleterious matter is removed and retained in the filter 129. The inwardly facing side of the instrument panel 128 affords a convenient mounting surface for the apparatus comprising the amplifiers and other electrical equipment of the machine.

In operation of the mechanical parts of the apparatus thus far described as a transmitter, a person wishing to transmit a picture or message in facsimile writes or otherwise impresses the message on the surface of the sheet 38. Where the machine 9 is to be used for a commercial service, the message sheet 38 is generally provided with the printed matter thereon indicated by the reference character 138 (Fig. 1) and the message is to be written beneath this printed matter. To insure that the message will be recorded at the receiver in its proper position on the receiving sheet or blank, the sheet displaying the matter to be transmitted is wrapped around the cylinder 12 in such a way that one edge thereof lies along a line or mark 139 which is in proper angular position with respect to the lens tube 108 when the member 40 engages the rod 34 (Fig. 8) to drive the cylinder 12.

At or before this time the machine 9 is started by drawing the rod 68 to the right as viewed on Fig. 1 by means of the handle 77, thereby starting the motors 18 and 126 and energizing the pickup lamp 107 and the transmitting amplifier TA associated with or built into the machine. The multiple contact send-receive switch 142 is turned to its "send" position. The effect of these operations on the electrical circuits of the machine and the corresponding operations that are to be performed by an attendant at the central office will be fully discussed hereinafter in connection with the Figures 12 to 14 of the drawings.

Upon receipt of an appropriate signal from the central office in a manner to be described, the electromagnet 58 will be energized to draw the member 45 from the notch 55 (Fig. 6) allowing the half nut member 41 to engage the lead screw 22 against which it is pressed by action of the friction discs 46 and 47 in the manner already explained in detail. When the surface of the sheet bearing the message to be transmitted has been scanned by axial movement of the cylinder 12, the lower end of the member 42, which travels along with the cylinder, engages the member 85 forcing the rod 68 to the left to operate the switch 65, thereby stopping the machine.

When desired the cylinder 12 may be restored to its initial position by rotating it manually in a clockwise direction to disengage the half nut 41 from the lead screw 24. As previously explained, the notch 60 on the bail 45 compels the operator to completely disengage the half nut before the cylinder can be returned. It will be understood that the bail may be provided with several spaced notches when transmission of several standard lengths of messages is contemplated. When the cylinder 12 is returned as far as it will go to the right, the position of the bail 45 in the notch 55 prevents manual engagement of the half nut and the spring 63 prevents inadvertent movement of the cylinder 12 toward the left.

The mode of operation of machine 9, when used as a recorder, is similar to that already described except that the send-receive switch is placed in the "receive" position which conditions the control circuits of the machine in a manner to be described so that the magnet 99 will be energized with the magnet 58 to move the stylus 91 into engagement with a recording blank retained in position on the drum 12 by the garter spring 39.

Referring to Fig. 12 of the drawings, diagrammatically showing electrical features of the machine 9 and the central office sending and receiving equipment, the apparatus parts are given the same reference characters previously assigned in connection with the description of Figs. 1 to 10. The magnets 99 and 58 are the stylus and half nut magnets respectively and the motors 18 and 126 are the driving motor and light chopper motor respectively. These magnets and motors are connected to an alternating current source 145 through the switch 65. The send-receive switch 142 is diagrammatically shown as comprising five simultaneously operated switch arms 146 which may be conveniently mounted upon a manually rotatable shaft.

L indicates a communication circuit interconnecting the central office diagrammatically shown at the left of Fig. 12 and a machine 9 of the type shown in Fig. 1 of the drawings. The line L terminates at the central station in a jack 147 and is connected to contacts of the send-receive switch 142 of the machine 9 so that it may be placed in direct communication with the transmitting amplifier TA or the receiving amplifier RA. It will be understood that there are as many active jacks as there are machines 9 in service and that these jacks and their associated signals are preferably grouped together. The communication circuit L is bridged by inductances 149 and 151 at the central office and the transmitter receiver 9 respectively. The midpoint of the inductance 151 is connected through the coil of the polar relay 152 and the resistance 153 to a brush 154 (Figs. 2 and 12) which bears on a conducting disc 156 rotatable with the shaft 14. The conducting disc 156, which is grounded through the machine parts, is provided with an insulating portion 157 which is correctly placed angularly with respect to the line 130 inscribed on the cylinder 12.

The midpoint of the inductance 149 at the central office is connected through relay coils 158 and 159 to a source of negative potential via the contact springs 161 of the jack 147. The relay 158 is of the usual type whereas the relay 159 is adjusted so that its contact tongue will move only when it is energized by current of a strength greater than that necessary to operate the relay 158. The tongue of the relay 159 is connected to a suitable source of potential and lights a lamp 162 from its front contact when it is energized. The tongue of the relay 158 is connected to the back contact of the relay 159 and its back contact is connected to a lamp 163. The resistance 153, which is included in what may be called a "simplex-circuit" utilizing both sides of the line L and derived from the midpoints of the inductances 149 and 151, is bridged via one of the switch blades 146 by the tongue and front contact of a relay 166, the operating coil of which is connected to the plate supply conductor 167 for the amplifier RA which is fed from the rectifier 168.

Figure 13:
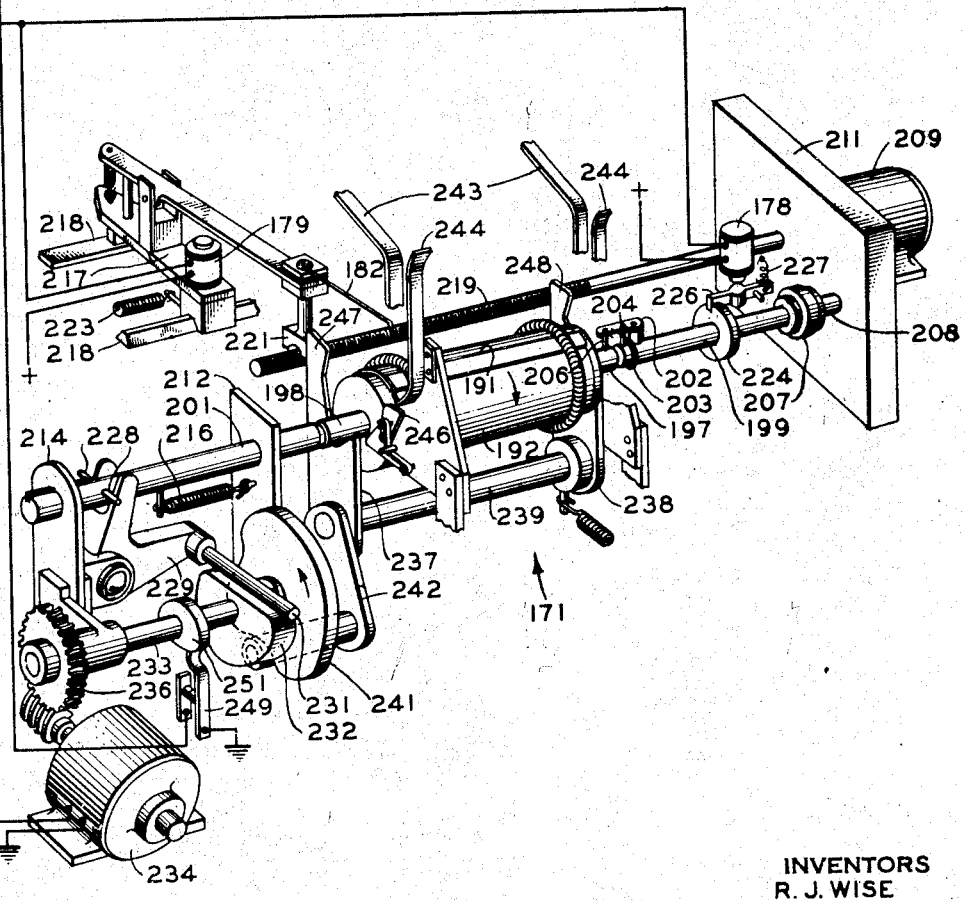
Fig. 13 is a diagrammatic showing of the electrical features of terminal transmitting and recording equipment suited for use in a system of Figs. 12 and 14.

When it is desired to transmit a message to the central station from the machine 9, the send-receive switch 142 is moved to its send position, which it occupies in Fig. 12 of the drawings, and the start-stop switch 65 is closed to energize the motors 18 and 126 as previously explained. The driving motor 18 turns the cylinder 12, but the cylinder does not feed due to the half-nut 41 being disengaged by the half-nut engaging bail 45. The lamp 107 is lighted, the chopper motor 126 starts and the amplifiers TA and RA are energized. As the current from the rectifier 168 through the relay 166 approaches its maximum value, this relay is operated, short-circuiting the resistor 153 in the simplex-circuit and lifting the ground off that circuit which was applied through its back contact via the conductor 169. The resulting increase in current through the simplex-circuit operates the relay 159 at the central office lighting the lamp 162. A receiver 171, indicated diagrammatically on Fig. 12 and more in detail by Fig. 13, at the central office, which is associated with the plug 172, is connected to the line L by placing the plug 172 in the jack 147 connected to the calling machine and the simplex-circuit is extended through the coil of relay 173 and contacts of relay 177 to negative potential. The relay 173 is adjusted similar to the relay 159 to operate upon the higher values of current in the simplex circuit and this relay pulls up and operates a slow-to-release relay 174, which removes a locking circuit over the conductor 176 from the coil of a relay 177, making this last named relay responsive to the next operation of relay 173 by the establishment of a temporary locking circuit over conductor 176 and to make contact of relay 173. When the simplex circuit is interrupted at the phasing contact 156 of the send-receive machine 9, the relay 173 releases, releasing the relay 177, which locks itself out through one of its break contacts and the make contact of relay 174 and operates the phasing magnet 178 and the half-nut and stylus magnet 179 of the recorder 171 over the conductor 180 (Figs. 12 and 13). The relay 177 also reverses the polarity of battery in the simplex circuit to positive, operating the polar relay 152 previously described in the send-receive machine 9, which in turn closes the circuit including the half-nut engaging magnet 58, thus allowing the half-nut to drop into the feed screw to start feeding of the cylinder 12 toward the left so that it is scanned by the light 107.

As the message on the sheet 38 is scanned, the current set up in the photocell 110 is passed through the transmitting amplifier TA over the line L to the recording amplifier RA1 in the central office from which it is fed through the signal inverter 181 to the stylus 182 (Figs. 12 and 13) of the recorder 171.

The signal inverter 181 is used since the copy transmitted from the photocell 110 is a negative copy. The copy received at the central office upon the recorder 171 is reversed in the inverting device 181 which comprises two vacuum tubes 184 and 186 heavily biased for class C operation by a negative biasing potential applied to the grids from the source 187. The plates of the tubes joined in parallel are connected directly to the stylus 182 and are also connected through a resistance 188 to a source of relatively high potential 189. When a heavy signal is fed into the circuit a heavy plate current flows from the source 189 through the resistor 188 of such magnitude that the resultant voltage is not sufficient to produce a mark on the recording paper 191 on the recording drum 192. When no signal is fed to the circuit, no current is drawn through the tubes and the total voltage from the source 189 is applied to the stylus 182 thus causing it to record a mark. The fluctuations in the level of the incoming signal control the amount of voltage available for marking purposes thus exactly reproducing the received signals at the stylus except that the maximum and minimum values of the signals are reversed.

As the cylinder 12 of the machine 9 moves from right to left it eventually operates the start-stop switch 65 as previously explained placing it in the stop position. The current value in the simplex circuit and therefore in the conductor 174 returns to its normal value which causes the relay 173 to release. This releases the relay 174 which takes the lockout circuit from the relay 177 and operates this relay, initiating a signal which is transmitted over the conductor 194 (Figs 12 and 13) to operate the relay 196 (Fig. 13) which controls the drum changing mechanism of the recorder 171. The polarity of the current source to the simplex circuit is also reversed. The plug 172 of the recorder is then pulled down from the jack 147.

The mechanical arrangement of recorder 171 is similar to that disclosed in the application of G. H. Ridings, et al., Ser. No. 264,512, filed March 28, 1939, now Patent No. 2,255,869, granted September 16, 1941, and the mechanism illustrated diagrammatically on Fig. 13 of the drawings will now be briefly described for the sake of completeness. The cylinder 192 of the recorder 171 is interchangeable with like cylinders and is provided with arbors 197 and 198 which are supported for rotation by means of spindles 199 and 201 provided with conical ends for engaging indentations in the ends of the arbors on the drum. The spindle 199 rotates the drum 192 by means of a driving connection comprising a pivoted arm 202 attached to the spindle 199 and urged by means of a spring 203 secured to the spindle and the arm against a stop pin 204 extending radially from the spindle. The movable end of the arm 202 engages a pin 206 formed on the arbor 197. A friction clutch 207 serves to connect the spindle 199 with a constantly rotating shaft 208 so that the spindle may be stopped when desired. A motor 209 operating in synchronism with the motor 10 of the machine 9 drives the shaft 208 through suitable reduction gearing 211.

The rod 201 which serves to support the arbor 198 is slidably carried by a pair of brackets 212 and 214. The spring 216 serves to urge the rod 201 toward the right as viewed in the drawing.

The stylus supporting carriage 217 is slidably mounted on rails 218 along which it may be propelled by a feed screw 219 and a half nut 221. The feed screw 219 is driven by the motor 209 through an appropriate gear in the reduction gearing 211. A retractile spring 222 is attached to the carriage 217 and to any convenient stationary member so that when the half nut 221 is disengaged from the feed screw, the carriage will be returned to an initial scanning point at the left as viewed in the drawing. It will be understood that the carriage 217 is also provided with a scanning light (not shown), a photocell 223 (Fig. 12) and a system of lenses (not shown) by which optical scanning of subject matter for transmission to the machine 9 appearing on a sheet, similar to the recording sheet 191, may be effected.

The shaft 199 is provided with a notched disc 224 adapted for engagement with the pivoted latch member 226 which is urged into latching position by the spring 227. The angular position of the notch in the disc 224 is so located with respect to the lap in the sheet 191 that when the disc is released the stylus 182 is at the beginning of a scanning line on the sheet.

In order to release one cylinder 192 and engage another for rotation, the rod 201 is provided with a pin 228 which is positioned in the path of the vertical arm of a bell crank 229 pivoted on the bracket 214 as shown. The cam follower 231 cooperates with a cam 232 which is secured on a shaft 233 driven from the motor 234 by a worm wheel 236. As the cam 232 is rotated, the horizontal arm of the bell crank 229 is raised thereby moving the shaft 201 to the left against the action of the spring 216. The cylinder drops and is received on a cradle formed by a pair of spaced upright members 237 and 238 which are secured to a rock shaft 239 oscillated by cam 241 and cam follower 242. The cams 232 and 241 are secured to the shaft 233 in such angular relationship that a tilting of the cradle follows axial movement of the shaft 201.

Fresh cylinders are contained in a magazine, not shown in detail since a full illustration is not necessary to the understanding of the present invention, which comprises the parts 243 and 244. The arbors 197 and 198 of the lowermost cylinder in the magazine rest against detents 246, one of which appears in Fig. 13 of the drawings and they are released by engagement of the ends 247 and 248 of the upright members of the cradle. The new cylinder falls by gravity into the notches of the cradle and is picked up upon the next succeeding inward movement of the rod 201, following which the circuit of the motor 234 is interrupted by the relay 196 which is controlled by a pair of contacts 249 operated by a cam 251.

When the machine 9 is used to receive a message from the central office over the line L, the plug 252 is inserted in the jack 147 of the machine to be called which extends the simplex circuit over the conductor 253 through the coil of the relay 254 to a source of positive potential which operates the polar relay 152 in the remote send-receive machine 9 to sound the buzzer or other suitable signal 256. The machine of Fig. 13 may serve as a transmitter as previously described in which case the photocell 223 on the scanning carriage thereof is connected by a transmitting amplifier TA1 to the plug 252 through the jack 147, the line L, the transmit-receive switch 142 in the receive position to the receiving amplifier RA. Picture reversal, to obtain a positive copy at the machine 9, may be accomplished by using an additional photocell 255 as disclosed in Patent No. 2,158,391 to R. J. Wise. Conductors 257 and 257' correspond in function to conductors 188 and 194 respectively and are connected thereto. If desired, a separate machine similar to 171 may be used equipped with the photocells 223 and 255 in which case, the conductors 257 and 257' will be connected to this separate machine. The operator at the transmit-receive machine 9 places a receiving blank on the cylinder and moves the transmit-receive switch 142 to the receive position and operates the start-stop switch 65 to the start position. The buzzer circuit is interrupted and the amplifier RA heats up causing the relay 166 to operate. The resistance 153 in the simplex circuit is not shunted in this case, being open at the transmit-receive switch, and the value of current in the simplex circuit remains low. A gain control 260 (Fig. 1) in the amplifier RA allows the operator to adjust the machine for best results when working as a receiver. The relay 254 of the transmitter bank of relays is adjusted to operate on this low value of current, and the slow-to-release relay 258 and relay 259 and their associated circuits will be responsive to the phasing pulse from the transmitter in the same manner as previously described in connection with relays 173, 174 and 177. The low current relay 158 associated with the line L follows the phasing pulse giving a flicker on the receiving lamp 163 indicating that the remote machine is in proper operating condition for receiving. At the end of transmission from the central office, the transmitter plug 252 is removed from the jack but the remote machine will continue to run until the cylinder operates the start stop switch 65 in the manner previously explained.

Fig. 14 of the drawings disclosed a modified electrical system for the transmitter-receiver 9 of Fig. 1 which includes all of the apparatus disclosed in Fig. 12 with the addition of an alternating current relay 262, which prevents operation of the machine 9 with the switch 142 in the incorrect position for the operation desired, and a signal lamp 263 which indicates misplacement of the switch 142 by illuminating the transparent or translucent member 264 shown in Fig. 1. The parts which are identical with those illustrated in Fig. 12 are designated by the same reference characters on Fig. 14. In Fig. 14 the relay 266 is similar to the relay 166 in Fig. 12 but the operating circuits thereof are modified in a manner which will presently appear.

The operating coil of the relay 262 is connected in series with start contact of the start stop switch 65 and the contact tongue of the polar relay 152. The latter is in the idle position shown in Fig. 14, when no messages are being transmitted or received, because of the negative battery applied to the mid-point of the high current relay 268 at the central office. When a message is to be sent from the machine 9, switch 65 is placed on its start contact and relay 262 is energized and locked through its contact tongue 269. This prevents the relay from releasing when the polarity of the simplex circuit is reversed as explained in connection with Fig. 12. The relay contact tongue 271 short circuits the resistance 153 to operate the calling relay 268 at the central office.

The tongue 272 of the relay 266 removes the direct ground from the simplex line making effective the ground applied through the disc 156 and the brush 154. The tongue 273 of the same relay connects the half-nut magnet 58 in circuit with the polar relay 152 so that the half nut magnet will be operated in response to operation of the polar relay in the manner explained in connection with Fig. 12 of the drawings.

The relay 262 is not operated when the machine 9 is used as a receiver since the polar relay is reversed to operate the buzzer 256 from the central office prior to movement of the switch 65 to its start position and does not resume its idle position until reception of the message by the machine 9 is complete. Resumption of the idle position by the polar relay operates the lamp 263 as a signal in a manner to be described. The half-nut magnet 58 is operated for reception upon operation of the relay 266.

The lamp 263 is connected in series with the filament of the rectifier tube 168 and may be short-circuited over the conductors 275 and 276 if the switch 142 is in its correct position for transmission or reception respectively in the following manner. When the machine 9 is being used as a transmitter the contact tongue 277 of the relay 262 and its front contact are included in this short-circuiting path. When the machine 9 is operated as a receiver, the contact tongue 277 cooperates with a back contact to close the short-circuiting path around the lamp 263.

The relay 262 functions to prevent transmission with the switch 142 in the receive position in the following manner. The relay 262 is operated from the start-stop switch 65 when the latter is moved to start position, but only if the tongue of the polar relay 152 occupies the idle position shown in Fig. 14. With the start-stop switch 65 in start position and the switch 142 in the proper transmit position, the indicator lamp 263 in the filament circuit of the rectifier tube 168 is short-circuited through the transmit receive switch 142. If the transmit receive switch is incorrectly placed in the receive position when sending is desired, the resistance of the lamp 263 is sufficient to prevent the rectifier tube from heating up to the point where the relay 268 will operate. The short circuit path previously described around the lamp 263 is open at the switch 142, which, as pointed out above, maintains the lamp in operation and indicates that the switch is in the wrong position.

If the transmit receive switch 142 is in the send position when a message is to be received in response to a call from the central office, operation of the relay 266 to engage the half-nut 58 is prevented since the lamp 263 remains lighted and prevents the rectifier from supplying plate current to the amplifier. The short circuit path around the lamp including the tongue 277 of the deenergized relay 262 is open under these conditions at the switch 142.

Thus a person inadvertently trying to send or receive with the transmit receive switch in the incorrect position is prevented from doing so and the current passing through the lamp gives an indication of the error.

When transmission of a message from the main office to the send-receive machine 9, operating as a receiver, is completed and the central office transmitter is disconnected from the circuit, the operation of the relay 262, effected by the idle positioning of polar relay 152, will light the lamp 263 and give an end of transmission indication and the customer may turn the machine 9 off manually by switch 65 if access to the telegram just received is desired. Otherwise the machine will be automatically stopped when the cylinder 12 moves all the way to the left.

The central office equipment shown at the left of Fig. 14 is slightly different from that disclosed in Fig. 12. Two jacks 279 and 281 are employed for transmitting and receiving respectively to accommodate the sending plug 282 and the receiving plug 283. These two jacks for a single machine 9 are provided to make it possible for the operator at the main office to exercise control over the power received from the send-receive machine 9 by means of a pad 284 without introducing a loss in the line which would also affect transmission to the send-receive machine from the central office. The same type of recorder and transmitter shown in Fig. 13 may be used with the apparatus in Fig. 14 and the receiving relays 173, 174 and 177 are the same as described previously. Connection to the recorder and transmitter is established over conductors 188' and 194'. Also transmitting relays 254, 256 and 258 are the same as the identical transmitting relays described in connection with Fig. 12 of the drawings.

The calling arrangement in the central office as shown in Fig. 14 for the modified apparatus comprises the previously described relay 268 which lights the calling signal lamp 285 when the start-stop switch 65 is placed in the start position. This lamp is extinguished when the plug 283 is inserted in the jack 281.

The coil of the relay 268 corresponds in function to the inductance 148 of Fig. 12. However, when the plug 282 is inserted in the jack 279, the inductance 286 terminates the simplex circuit formerly terminated at the mid-point of the winding of the relay 268. An inductance 287 terminates the simplex circuit when the receiving jack 281 is in use.

It is believed that operation of the apparatus of Fig. 14 in conjunction with the machine of Fig. 13 for transmission to and from machine 9 will be obvious from the foregoing in view of the previous description of the operation of the apparatus of Fig. 12 in conjunction with the machine of Fig. 13.

Figs. 12, 13 and 14 disclose systems for establishing communication with a central office from a plurality of machines 9 terminating in jacks at the central office. However, the machine 9 of the present invention is especially adapted for use as a subscriber's substation machine in the concentrator system disclosed and claimed in the copending application of Blanton et al., Ser No. 298,872, filed Oct. 11, 1939, now Patent No. 2,265,339.

Fig. 11 of the drawings shows a modified form of Fig. 1 which is provided with an extended cylinder 289 of ample length to accommodate two message sheets, one of which may be a sheet 291 containing a message for transmission, and the other in the form of a suitable blank 292 adapted to be marked by the stylus 293, the latter being similar to the stylus previously described and mounted upon a shaft 294 corresponding to the shaft 96 of Figs. 1 to 10. With the elongated cylinder 289, a message may be received at any time since it will not be necessary to remove the blank 292 until the message has been recorded thereon inasmuch as space on the cylinder is available to accommodate a message for sending at any time. Both of the sheets 291 and 292 are retained in position by garter spring members 296 and 297 in the manner previously described and in addition the flanges 298 and 299 are recessed in a manner similar to that illustrated in Fig. 8 of the drawings.

From the foregoing complete description of two illustrative embodiments of the invention and their operation, it will be seen that a telegraph system for providing transmission to or from a customer's office and operable by inexperienced persons is provided by the present invention. The invention also provides facsimile machines which, because of the inventive features thereof, can be operated interchangeably as transmitters or receivers by unskilled persons.

While this invention has been explained in detail in connection with several embodiments thereof, it is to be understood that the invention may be embodied in other forms and, therefore, the invention is not limited except as indicated by the terms and scope of the appended claims.

What is claimed is:

1. Facsimile scanning mechanism comprising a rotatable cylinder to support a member to be scanned, means to slidably support said cylinder and impart rotation thereto, a lead screw, a member rotatably supported by said cylinder and extending therefrom, and means to bring said cylinder supported member into operative engagement with said lead screw.

2. In facsimile apparatus, a rotatable copyholder and a stationary scanning device, a rotatable support upon which said copyholder is slidably mounted, means to rotate said support, and means to impart scanning movement to said copyholder comprising a screw threaded member and a member having frictional engagement with said copyholder whereby to be biased for movement into contact with said screw threaded member, said screw threaded member being positioned to be engaged by said frictionally biased member.

3. In facsimile apparatus, a rotatable copyholder and a stationary scanning device, a rotatable support upon which said copyholder is slidably mounted, means to rotate said support, a lead screw spaced from said rotatable support, a member having frictional engagement with said copyholder and adapted to engage said lead screw when said copyholder rotates with said support, and means to permit said copyholder to be rotated manually to disengage said member from said lead screw.

4. A facsimile transmitter and receiver comprising a copyholder, a rotatable member to support said copyholder, means to rotate said member during a scanning operation, a lead screw, a recessed member designed to engage said lead screw upon rotation of said copyholder to advance the same axially upon said support, means to prevent engagement of said recessed member with said lead screw, and an electromagnetic device to operate said last named means whereby to permit said recessed member to engage said lead screw.

5. Facsimile scanning mechanism comprising a rotatable drum to support a member to be scanned, a shaft extending axially through said drum to rotatably and sidably support the same, a lead screw spaced from said shaft, a member projecting radially from said drum and rotatably supported thereon, friction means interposed between said radially extending member and said drum tending to drive said member, a member having a threaded recess on said radial member to engage said lead screw, and means operable in response to a start signal to permit engagement of said recess with said lead screw.

6. Facsimile scanning mechanism comprising a rotatable drum to support a member to be scanned, a shaft extending axially through said drum to rotatably and slidably support the same, means to advance said drum longitudinally of said shaft during a scanning operation, and means designed to cooperate with said drum advancing means and being frictionally coupled to said drum.

7. Facsimile scanning mechanism comprising a copyholder, means to support said copyholder, means to advance said copyholder along said support for a scanning operation, a member for connecting said advancing means with said copyholder, means to prevent engagement of said member with said advancing means, signal controlled means to operate said engagement preventing means to permit reengagement of said second named means and said member.

8. Facsimile scanning mechanism comprising a copyholder, means to support said copyholder, means to advance said copyholder along said support for a scanning operation, a member for connecting said advancing means with said copyholder, means to prevent engagement of said member with said advancing means, signal controlled means to operate said engagement preventing means, and means to prevent axial movement of said copyholder except upon operation of said engagement preventing means.

9. A facsimile scanning mechanism comprising a copyholder, a shaft to support said copyholder rotatably and slidably and to drive the same, a lead screw to advance said copyholder for a scanning operation, a member having a threaded recess for connecting said lead screw with said copyholder, a member extending longitudinally of said copyholder to prevent engagement of said first named member with said lead screw, and signal controlled means to operate said longitudinally extending member whereby to cause engagement of said first named member with said lead screw.

10. Facsimile scanning mechanism comprising a copyholder, a shaft to support said copyholder rotatably and slidably and to drive the same, a lead screw to advance said copyholder along said shaft for a scanning operation, a member having a threaded recess for connecting said lead screw with said copyholder, a bail member extending longitudinally of said copyholder to prevent engagement of said first named member with said lead screw, signal controlled means to operate said bail member, and a flat spring member positioned in the path of movement of said first named member when it is disengaged from said lead screw to prevent longitudinal movement of said copyholder except upon operation of said bail member.

11. Facsimile scanning mechanism comprising a rotatable drum for supporting a member to be scanned, a shaft rotatably and slidably supporting said drum, a threaded shaft extending parallel with said first named shaft, a member rotatably mounted on said drum, a member having a threaded recess carried adjacent the free end of said rotatably mounted member and positioned thereon to engage said threaded shaft, a bail member extending longitudinally of said shaft and positioned in the path of swinging movement of said radially extending member, and electromagnetic means to move said bail member to permit engagement of said threaded member with said threaded shaft.

12. A telegraph system comprising a telegraph transmitting device, means to receive a message containing sheet for cooperation with said transmitting device, means to drive said message receiving means, means for initiating movement of said drive means, and means operable in response to the operation of said movement initiating means when said device is in transmitting condition for signaling a remote receiving station to apprise an attendant at said receiving station that a message is awaiting transmission.

13. A telegraph system comprising a telegraph transmitting device, a copyholder for cooperation with said transmitting device, means to drive said copyholder, means for initiating movement of said drive means, means operable in response to the operation of said movement initiating means when said device is in transmitting condition for signaling a remote receiving station, and means at said receiving station to control the scanning operation of said copyholder.

14. Facsimile scanning mechanism comprising a rotatable drum to support a member to be scanned, a shaft extending axially through said drum to slidably and rotatably support the same, a member secured to said drum in spaced relation to said shaft, and a radially projected member rigidly mounted on said shaft engageable with said drum member to cause said drum to rotate with said shaft.

15. Facsimile scanning mechanism comprising a rotatable drum to support a member to be scanned, a shaft extending axially through said drum to slidably and rotatably support the same, axially extending members in said drum spaced from said shaft and angularly spaced from each other about the axis of said drum, and a member projecting radially from said shaft to engage one of said angularly spaced members to cause said drum to rotate with said shaft.

16. A facsimile transmitter-receiver comprising an amplifier, a source of current for said amplifier, a relay in circuit with said current source, a signaling circuit including a serially connected resistance, an interrupter in said signaling circuit, and circuit connections to the contacts of said relay for short-circuiting said resistance to produce a rise of current in said signaling circuit for signaling purposes.

17. A facsimile transmitter-receiver comprising a "send-receive" switch, mechanism in said transmitter-receiver operable upon connection to a power source, an amplifier for said transmitter-receiver, a power supply for said amplifier, a relay, connections between the contacts of said relay, said "send-receive" switch and the power supply for said amplifier, said connections being established only when said "send-receive" switch is in the send position for transmission, and in the receive position for reception.

18. A facsimile transmitter-receiver comprising a "send-receive" switch, mechanism in said transmitter-receiver operable upon connection to a power source, a relay in circuit with said power source, an amplifier for said transmitter-receiver, a signal operated relay controlled from a remote station, the first named relay being connected through the contacts of said signal operated relay to permit operation of said amplifier only when said "send-receive" switch and said first named relay are in correct position for the desired operation of said transmitter-receiver.

19. A facsimile transmitter-receiver comprising a "send-receive" switch, mechanism in said transmitter-receiver operable upon connection to a power source, a switch for connecting said mechanism to said power source, a relay in circuit with said switch, an amplifier for said transmitter-receiver, a signal operated polar relay controlled from a remote station, the first named relay being connected through the contacts of said signal operated polar relay to permit operation of said amplifier only when said "send-receive" switch is in the send position for transmission and the receive position for reception, and when said first named relay is energized for transmission and deenergized for reception.

20. In a facsimile telegraph system, a plurality of facsimile transmitters, a plurality of communication circuits, one for each transmitter, a facsimile receiver having a movable member, means including one of said circuits to interconnect any one of said transmitters and said receiver for communication, a relay to control movement of said movable member, means rendered operative under the control of said one circuit upon the interconnection of one of said transmitters with said receiver to prepare said relay for exercising its control function, and means responsive to the operative condition of said transmitter in communication with said receiver for actuating said relay to initiate movement of said movable member of said receiver.

21. In a facsimile telegraph system, a plurality of facsimile transmitters, a facsimile receiver having a movable member, means to interconnect any one of said transmitters and said receiver for communication, means to control movement of said movable member, means associated with each of said transmitters and operable periodically for controlling the starting time of said receiver connected therewith, and means, responsive to one of the periodic operations of said controlling means associated with said transmitter in communication with said receiver, for initiating operation of said movement controlling means to cause movement of said movable member of said receiver.

22. In a facsimile telegraph system, a plurality of facsimile transmitters, a facsimile receiver having a movable scanning member, communication circuits extending from said facsimile transmitters and terminating at a common point available for connection to said receiver, a relay to control scanning movement of said member, a second relay operative upon interconnection of one of said transmitters with said receiver to prepare said first named relay for exercising its control function, and a third relay, responsive to the operative condition of said transmitter in communication with said receiver, for actuating said first named relay to initiate operation of said receiver scanning member.

23. In a telegraph system a plurality of stations, a central station, communication circuits to interconnect said first named stations with said central station, calling relays, one for each of said circuits at said central station, and means whereby each of said relays serves as a simplexed connection for the said circuit with which it is associated to provide communication with said first named stations over said simplexed circuits derived through said relays.

24. In a telegraph system a plurality of stations, a central station, communication circuits extending from said first named stations to said central station and each terminating in a pair of jacks available for connection to the apparatus in said central station, a volume control rheostat associated with one of said pair of jacks for each circuit, means whereby said central station apparatus is connected in series with said rheostat when connected to said communication circuit through said jack associated with said rheostat, said rheostat being omitted when said central station apparatus is connected to the communication circuit through the remaining jack.

25. In a telegraph system, a plurality of stations, a central station, communication circuits extending from said first named stations and terminating in said central station, simplexed connections at said central station for each of said communication circuits including a standby source of potential for said simplexed circuits, and means to disconnect said standby potential from said simplexed crcuits when the apparatus of said central station is connected to said communication circuits.

26. In a telegraph system, a plurality of stations, a central station, communication circuits extending from said first named stations to said central station and terminating at a point conveniently available for connection to the apparatus of said central station, a single jack forming the terminus of each communication circuit, transmitting apparatus and receiving apparatus in said central station, a plug associated with said transmitting apparatus, a second plug associated with said receiving apparatus, a calling signal and a transmission signal associated with each jack, each jack affording communication from said transmitting apparatus or said receiving apparatus to the first named station associated therewith.

27. In a facsimile machine, in combination, means to support a sheet to be scanned, a scanning device, means to carry said sheet supporting means, the latter means being movable thereon to an accessible position, mechanism to provide relative scanning movement between said scanning device and said sheet supporting means, and means to provide for moving said sheet supporting means on its said carrying means to the accessible position independently of said mechanism whereby access may be had to said sheet.

28. Facsimile scanning mechanism comprising a rotatable drum to support a member to be scanned, a shaft extending axially through said drum to slidably and rotatably support the same, a member rigidly secured to and projecting from said shaft, and means in said drum to be engaged by said member to cause said drum to rotate with said shaft, said means permitting limited angular movement of said drum with respect to said shaft.

29. A facsimile telegraph system comprising means to generate currents representing the varying intensities of light and shadow of the transmitted subject matter, a vacuum tube, means to apply signals representing said currents to the input circuit of said vacuum tube, recording means for cooperating with a sensitive receiving surface, said recording means being connected to the output circuit of said vacuum tube, a source of current supply, means to furnish simultaneously current to said recording means and space current for said vacuum tube, and means including a resistance for varying inversely the two currents derived from said source.

30. A facsimile telegraph system comprising means to generate currents representing the varying intensities of light and shadow of the transmitted subject matter, a vacuum tube, means to apply signals representing said currents to the input circuit of said vacuum tube, a recording circuit including an electrode and an electrosensitive receiving surface, a source of current supply, and means including a resistance for connecting said source in parallel with said recording circuit and the space discharge path of said vacuum tube whereby the currents in the recording circuit and the space discharge path of the vacuum tube vary inversely when signals are applied to the input circuit of said vacuum tube.

RALEIGH J. WISE.
LOUIS G. STEWART.
ROBERT D. PARROTT.